US012530468B2

(12) United States Patent
Lang et al.

(10) Patent No.: US 12,530,468 B2
(45) Date of Patent: Jan. 20, 2026

(54) METHOD AND SYSTEM FOR ANALYZING COMPUTER SOFTWARE

(71) Applicant: ObjectSecurity LLC, San Diego, CA (US)

(72) Inventors: Ulrich Lang, San Diego, CA (US); Reza Fatahi, Encino, CA (US); Kenneth Adam Miller, Kilgore, TX (US); Alex Benlolo, Burmingham, AL (US)

(73) Assignee: Object Security LLC, San Diego, CA (US)

( * ) Notice: Subject to any disclaimer, the term of this patent is extended or adjusted under 35 U.S.C. 154(b) by 101 days.

(21) Appl. No.: 18/615,438

(22) Filed: Mar. 25, 2024

(65) Prior Publication Data

US 2024/0320343 A1 Sep. 26, 2024

Related U.S. Application Data

(60) Provisional application No. 63/454,601, filed on Mar. 24, 2023.

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 2020/0099704 | A1* | 3/2020 | Lee | H04L 63/1416 |
| 2020/0159934 | A1* | 5/2020 | Yamaguchi | G06F 16/9024 |
| 2020/0364334 | A1* | 11/2020 | Pevny | G06F 21/567 |
| 2021/0182031 | A1* | 6/2021 | Ye | G06N 3/04 |
| 2021/0264029 | A1* | 8/2021 | Yoo | G06F 16/9024 |
| 2021/0271762 | A1* | 9/2021 | McCourt | G06F 21/54 |

(Continued)

FOREIGN PATENT DOCUMENTS

CN 116305158 A * 6/2023 ........... G06F 21/577

*Primary Examiner* — Michael Pyzocha
(74) *Attorney, Agent, or Firm* — Muncy, Geissler, Olds & Lowe, P.C.

(57) ABSTRACT

Method and system for analyzing binary computing system program data for recursive semantics, the recursive semantics being computational constructs and mechanisms that facilitate self-reference or repetition within binary program inputs and that enable repeated execution of a block of code through direct self-reference, the method and system comprising: receiving binary program input; analyzing the binary program input using analysis, extracting aspects of structural and functional characteristics of the binary program input; creating graphical representation corresponding to the recursion and iteration processes within the binary program input's algorithms; initializing, if not previously established, program anthology, indexing algorithms derived from the binary program input within the program anthology, storing the indexed program anthology, retrieving previously categorized algorithms, and determining an output indicating the recursive semantics being present in the binary program input that enable the identification of potential security vulnerabilities.

20 Claims, 3 Drawing Sheets

"Processing of Algorithms for Efficient Co-embedding"

(56) References Cited

U.S. PATENT DOCUMENTS

| | | | | |
|---|---|---|---|---|
| 2021/0349723 A1* | 11/2021 | Hu | ............................ | G06F 8/53 |
| 2023/0315847 A1* | 10/2023 | Kirat | ..................... | G06F 21/563 |
| | | | | 726/23 |
| 2023/0394141 A1* | 12/2023 | Boulgakov | ............ | G06F 21/554 |
| 2024/0419806 A1* | 12/2024 | Li | ........................... | G06F 8/433 |

* cited by examiner

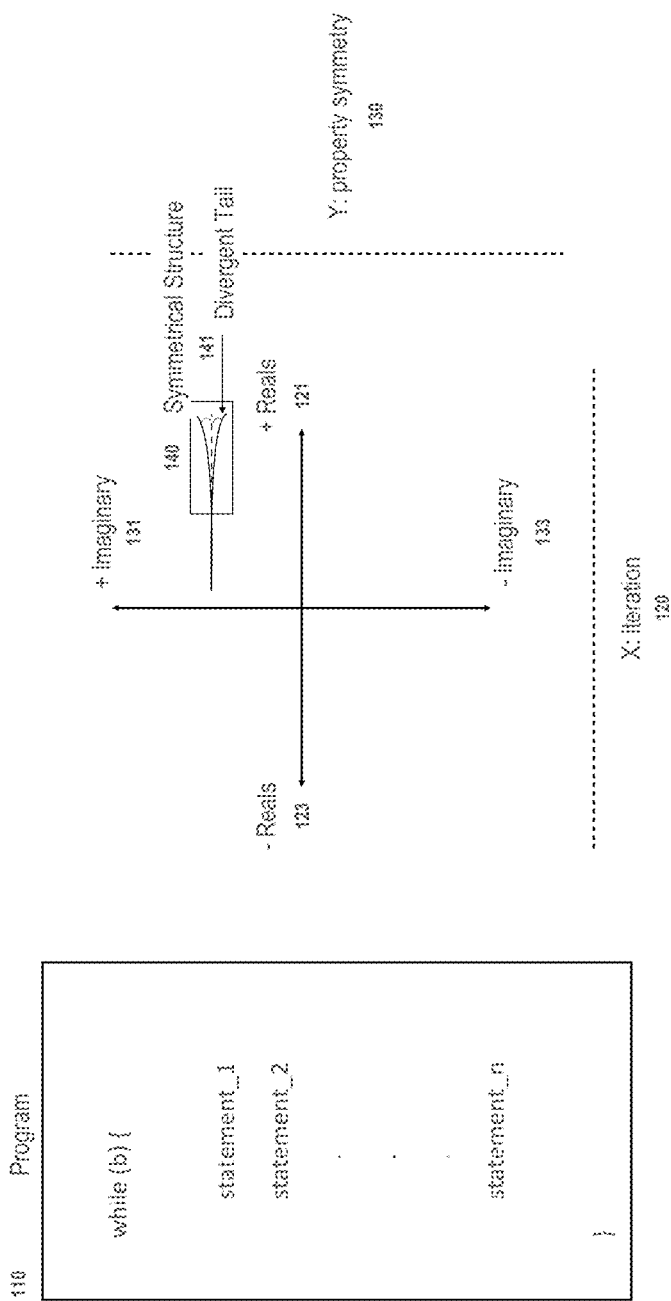
FIG. 1 "Processing of Algorithms for Efficient Co-embedding"

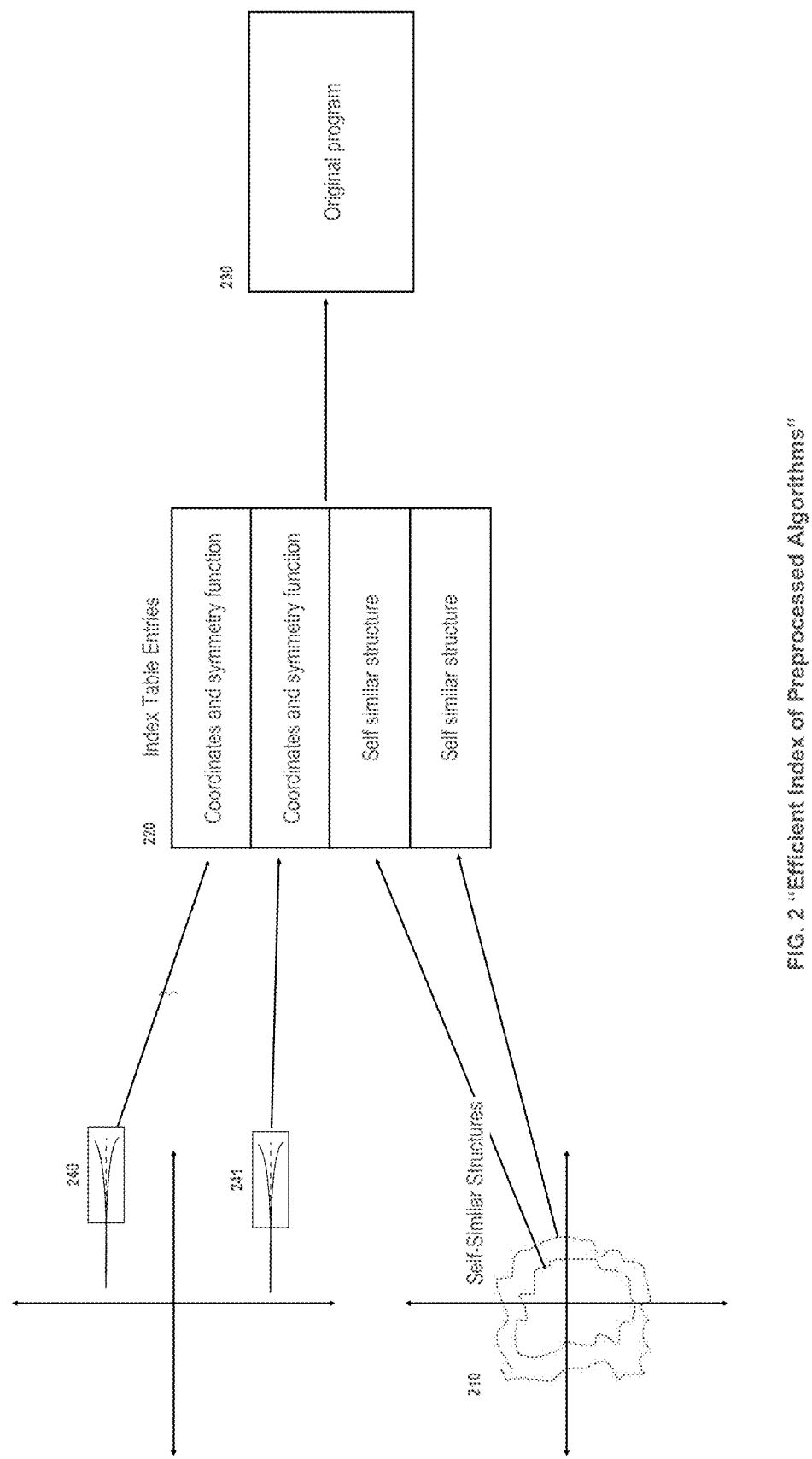
FIG. 2 "Efficient Index of Preprocessed Algorithms"

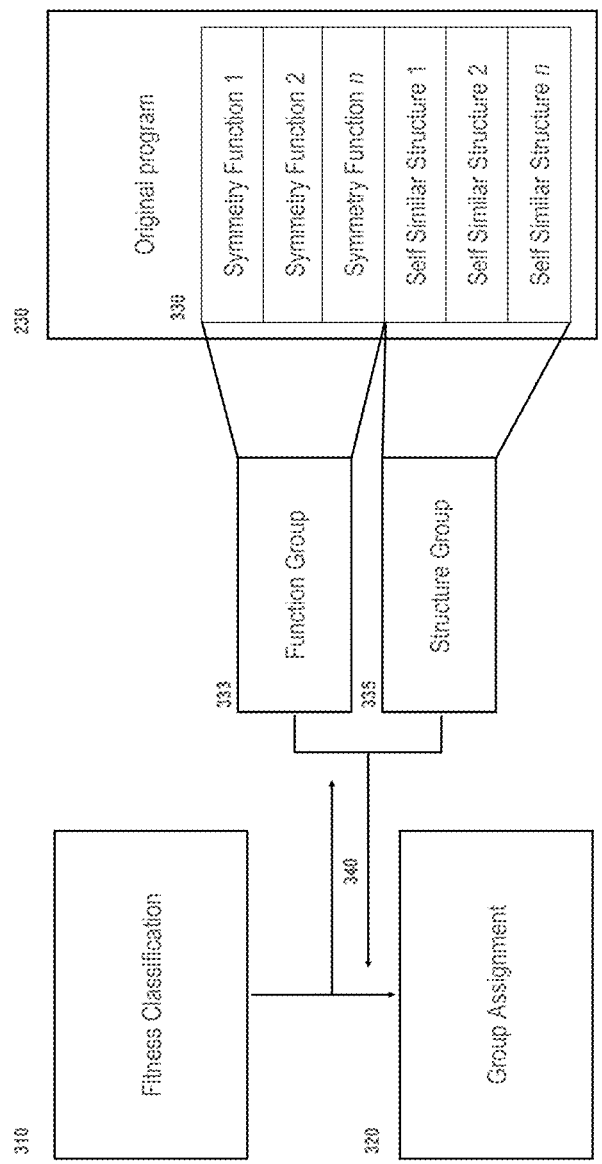
FIG. 3 "Efficient Index Lookup"

METHOD AND SYSTEM FOR ANALYZING COMPUTER SOFTWARE

This application claims priority to U.S. Provisional Application No. 63/454,601 entitled "Method and System for Analyzing Computer Software", which was filed on Mar. 24, 2023, and which is incorporated herein by reference.

This invention was made with government support under W31P4Q-22-C-0005 awarded by Defense Advanced Research Projects Agency. The government has certain rights in the invention.

BACKGROUND OF THE INVENTION

1. Field of the Invention

The subject matter disclosed herein relates to the cybersecurity of computing devices, for example embedded devices such as industrial control systems. Specifically, the present disclosure addresses systems and methods to detect and explain vulnerabilities, for example exploitations otherwise known as zero-day vulnerabilities.

2. Description of the Related Art

The rapidly evolving nature of cybersecurity threats presents a significant challenge to traditional binary analysis techniques, particularly in the context of embedded systems with Reduced Instruction Set Computer (RISC) and Complex Instruction Set Computer (CISC) architectures. Conventional binary analysis for vulnerability detection, especially in embedded device firmware and standard operating systems, relies on a diverse range of approaches. These include manual reverse engineering and limited automation with disparate static and dynamic analysis techniques. However, this conventional strategy faces limitations in scalability, accuracy, and efficiency, particularly when addressing complex vulnerabilities in diverse architectures.

Initially, vulnerability detection predominantly involved manual reverse engineering, where experts analyzed code (e.g., disassembled assembly, decompiled C, etc.) to identify potential vulnerabilities for further analysis. While effective for highly targeted operations, this approach is time-consuming, expensive, and requires expertise in a limited pool of talent. Nevertheless, it remains prone to human errors and does not scale, making it impractical for larger, more complex operations such as monitoring embedded devices in critical infrastructure. To overcome these limitations, automated static and dynamic analysis tools were developed. Static analysis tools, which examine code without executing it, identify potential vulnerabilities based on predefined patterns. Dynamic analysis tools analyze code during execution, providing insights into runtime behavior. Yet, these tools often generate a high number of false positives and negatives, especially in complex systems, leading to inefficient vulnerability detection.

Advancements in processors and memory storage have enabled significant improvements in early binary analysis concepts like control flow analysis and data flow analysis. Currently, the integration of machine learning and artificial intelligence into these conventional techniques have been pursued, though with limited and mixed success. The path explosion problem, where the analysis of paths, forks, and jumps in code often exceeds computational and memory capacities, remains a longstanding challenge. A growing trend to mitigate this issue involves utilizing graph theory in representing software structures, such as Abstract Syntax Trees (ASTs) and Intermediate Representations/Languages (IR/ILs). However, this approach faces scalability issues when data structures are not optimally organized. Contemporary graph databases like Neo4j, robust in nature, often encounter performance limitations due to their resource-intensive performance. Ongoing research is focused on enhancing graph management efficiency to streamline graph databases for more effective handling of complex data structures without compromising performance and scalability.

Another noteworthy approach is symbolic execution. The adoption of symbolic execution and formal techniques in binary analysis represents a significant shift from conventional approaches. These techniques analyze possible execution paths and logical conditions in a program, providing a more thorough and mathematically rigorous approach to vulnerability detection. Despite this, they also face challenges in addressing the intricacies of modern software environments, and frequently encounter bottlenecks including the path explosion problem.

Therefore, current approaches in binary analysis and vulnerabilities detection remain limited in their effectiveness and performance. Static analysis techniques continue to fail detecting runtime vulnerabilities, leading to a high rate of false positives due to their inability to comprehend the full context of code execution. Dynamic analysis techniques continue to lack visibility and context into the nuanced relationships between data structures and functions within programs. This gap in capability results in false negatives and missed opportunities to analyze structures and functions. Both approaches struggle with scalability, particularly in the face of large and complex software common in modern embedded devices.

Zero-Day Attacks

A "zero-day" attack, exploitation of an unknown vulnerability, is the greatest existing threat to enterprise infrastructures including those of critical infrastructure such as water, power, pharmaceutical, oil & gas, etc. Over the past decade, there have been several high-profile instances of zero-day attacks against critical infrastructures with the potential to cause disastrous outcomes. A prominent example of this occurred during 2016 when cybercriminals and/or nation-state actors exploited a vulnerability in the SCADA systems of Ukraine's power grid, leaving more than 230,000 residents without power. The present inventors recognize that one solution to prevent such attacks would be to avoid software flaws by using safe programming practices or programming constructs that do not allow such flaws. While this approach may be technically feasible, in many instances it is not practical. First, it would be impractical to redesign or re-implement the large body of legacy software that already exists. Second, even for newly-developed software, time-to-market pressure favors the quick delivery of new features over careful security considerations. Third, many software applications are produced by programmers that have not been properly trained in best security practices. And fourth, a software application is often created by composition with other software components whose provenance and adherence to security best practices can be of dubious quality. In short, not only are zero-day attacks severe, they are here to stay for the foreseeable future.

Binary Analysis Tools

Primus is an exemplary tool that can be used to describe and help implement other features of the present invention. Therefore, when "Primus" is mentioned, it should not be limiting to the selection of this specific tool and rather a depiction of a tool belonging to a binary analysis library capable of this analysis. Each of these tools and others not listed are available as various other examples of the analysis system. The choice of which tool to use will depend on the specific needs of the application and the interaction between one or more tools.

Primus is a part of the binary analysis tool family (binary analysis platform—BAP), which includes a variety of tools for analyzing compiled executables, including disassemblers, decompilers, debuggers, and dynamic binary instrumentation frameworks.

As for alternatives to Primus, there are several other tools in the binary analysis space that can be used for similar purposes, such as:

Pin: A dynamic binary instrumentation framework that allows for the creation of custom analysis tools.

Angr: A powerful and extensible binary analysis platform that supports both symbolic execution and concolic execution.

Triton: A dynamic binary analysis framework that supports both symbolic execution and taint analysis.

QEMU: A popular emulator that can be used for both debugging and dynamic binary instrumentation.

In general, these libraries allow multiplexing system calls and running code in different execution contexts, such as a traced interpreter, a dynamic binary translator, or a symbolic execution engine. Therefore, whether the tool is an interpreter or a symbolic execution engine depends on how it is used and what execution context is selected.

For example, if Primus is used to run code through a traced interpreter, then it can be considered an interpreter. On the other hand, if Primus is used to run code through a symbolic execution engine, then it can be considered a symbolic execution engine.

Analysis is Time-/Resource Consuming (incl. Property Recognition)

In the field of software engineering there is a strong need for methods to analyze compiled software. While there currently are many solutions to this problem, many of these methods are slow, and require either lots of time to fully analyze the software, or an extremely strong computer. A large reason for this computation power requirement is due to the complexity of modern computer programs, as well as the depth of cross-references for different sections of a program. For instance, each individual segment of code may have some sort of sorting algorithm that needs to be separately reversed and analyzed. Even though they serve similar functions (e.g., sorting data), they must still be analyzed separately. Canonical methods to reduce these function's analysis time has also proven ineffective. Many different reversing tools have attempted various ways to reduce analysis time, but have yet to achieve anything particularly powerful, either in depth of analysis or speed.

Domain Specific Language (DSL)

Conventional binary analysis platforms such as BAP require complex and detailed programming and specifications to specify what requirements to test for. This makes those tools hard to use, and inaccessible by non-experts.

A DSL is coding language that is created for a targeted purpose. DLSs are known to those skilled in the art of Computer Science. When "DSL" is mentioned in this document, it is referring to a coding language created for the purpose of specifying testing requirements against a binary file. DSLs make those specifications more accessible, for example allowing security analysts (vs. binary analysis experts) to specify requirements.

No/Low Code Platforms in Binary Analysis

In parallel with the advancements in DSL for binary analysis, the emergence of No/Low Code platforms (NLC) presents a transformative shift towards democratizing binary analysis. These platforms are designed to abstract the complexities inherent in binary analysis tasks, making the process more accessible to a broader audience, including those with limited programming expertise. No/low code platforms in the context of binary analysis leverage graphical user interfaces (GUIs) and pre-built templates to enable users to perform intricate analysis, construct workflows, and specify testing requirements without the need to write extensive code.

The essence of NLC lies in its user-friendly design, allowing security professionals, software developers, and academic researchers to intuitively interact with binary data. Users can drag and drop components, use visual data mapping, and apply condition-based logic to create powerful analysis pipelines that were previously only achievable with in-depth coding knowledge. This approach not only reduces the barrier to entry for conducting sophisticated binary analysis but also significantly accelerates the development cycle by enabling rapid prototyping and iteration.

Moreover, NLC facilitates a collaborative environment where domain experts can contribute their knowledge without needing to navigate the complexities of traditional programming languages. This collaboration can lead to more comprehensive testing frameworks, as security analysts can easily integrate their insights into the binary analysis process. In essence, NLC is redefining the landscape of binary analysis by offering a more easy-to-use, efficient, and interactive way to engage with binary data, making security analysis more accessible to a wider array of stakeholders. When "NLC" is mentioned in this document, it is referring to some interactive interface specifically for the purpose of binary analysis and associated tasks, such as configurations, networking, permissions, etc.

SUMMARY OF THE INVENTION

The present invention relates to a method and system for binary analysis aimed at detecting vulnerabilities in software systems. It introduces a novel approach for analyzing recursive semantics in binary code through a two-dimensional coordinate system, where recursive iterations and property symmetry are plotted to identify potential vulnerabilities. The invention features a unique system for categorizing and indexing algorithm structures based on their symmetry structures and self-similarities, transforming these structures into graph models for efficient retrieval and vulnerability assessment. It further includes a method for evaluating and categorizing algorithm structures as bifurcation structures, optimizing retrieval and vulnerability analysis. This approach enhances the accuracy and efficiency of vulnerability detection in binary code, specifically addressing the complexities of modern software systems. The invention is particularly beneficial for the analysis of embedded systems with RISC and CISC architectures, offering an advancement to the state-of-the-art for identifying and addressing security weaknesses in these systems. The detailed and methodical approach adopted by this invention represents a significant advancement in the field of binary analysis, providing a robust and efficient tool for vulnerability detection.

The following describes an invention that can be comprised of various analyses and assessments, as various forms, deployments, applications, programs, embodiments, and otherwise adaptable configurations to optimize computational efficiency and data processing capabilities of a binary analysis platform. The assessments may include and are not limited to:

Weak Pointers
Path Condition Computation
Precomputation with Indexing
Program Anthologies
Smart Value Generation
Symbolic Analysis Improvements
Fourier Transform Analysis The description of the invention, below, generalizes an individual assessment to a representative form. We will not be describing all of the details of individual analyses, rather, our description will overview the details of some examples of analyses, and instead emphasize the unique and unobvious aspects that are leveraged to increase computational efficiency and accuracy of results.

The present invention introduces a novel method for binary analysis, specifically designed to address the challenges in detecting vulnerabilities in embedded systems and CISC architectures. The invention represents a significant advancement in the field of binary analysis, particularly (but not limited to) in addressing the intricacies and vulnerabilities of embedded systems with RISC and CISC architectures.

By integrating a graph-based approach for recursive analysis with an efficient indexing and retrieval mechanism, and an optimized algorithm structure evaluation process, the invention advances the state of the art in binary analysis. The detailed and methodical approach adopted by this invention effectively addresses the limitations of conventional binary analysis approaches, providing a detailed and context-rich solution for identifying vulnerabilities in complex software systems, specifically through the recognition of self-similar structures and functions. This aspect of the invention enhances visibility into recursive patterns, enabling a more precise and context-aware analysis of potential security weaknesses.

In an example, the invention employs a graph-based approach to analyze recursive semantics within binary code. This method involves the application of a two-dimensional coordinate system to plot recursive structures, enabling a detailed and comprehensive analysis of complex program behaviors. This technique is especially adept at identifying symmetry functions within recursive processes, thereby enhancing the precision in vulnerability detection.

In an example, the invention employs an efficient indexing and retrieval mechanism for algorithmic structures. This mechanism categorizes algorithms based on their structural and functional characteristics, facilitating their rapid and accurate retrieval. The indexing system is designed to handle the complexities and variations inherent in different algorithms, providing a robust solution to the challenge of efficiently managing and accessing diverse algorithmic data.

The invention may include an optimized process for evaluating algorithm structures, focusing on bifurcation structures. This process assesses the characteristics of algorithm structures for efficient categorization, which aids in the rapid retrieval of relevant data from the index. The evaluation process is engineered to optimize the accuracy and efficiency of vulnerability detection, thereby advancing the capabilities in binary analysis.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 illustrates an example for analyzing recursive semantics in binary code using a two-dimensional coordinate system to map recursion and property symmetry.

FIG. 2 depicts an example of a transition from detailed graph models of algorithms to a consolidated indexing system, highlighting the categorization of algorithms based on structural and functional characteristics.

FIG. 3 illustrates an example of a visualization of the lookup process within the indexing system, showing the steps of fitness classification, group assignment, and algorithm retrieval based on symmetry functions and structures.

DETAILED DESCRIPTION

The words "exemplary" and/or "example" are used herein to mean "serving as an example, instance, or illustration." Any embodiment described herein as "exemplary" and/or "example" is not necessarily to be construed as preferred or advantageous over other embodiments.

The following analyses represent forms of binary assessments that can exist in the platform. The list is not all inclusive. The purpose of the list is to demonstrate examples of the types of analyses that can exist within this invention, illustrating the breadth and depth of computational strategies it can support. These examples, derived from the provisional application, include Weak Pointers, Path Condition Computation, Precomputation with Indexing, Program Anthologies, Smart Value Generation, Symbolic Analysis Improvements, and Fourier Transform Analysis. Each serves to demonstrate the flexibility of the platform in applying various forms or implementations of binary analysis assessments. The invention is capable of accommodating and integrating a wide range of analytical techniques beyond those explicitly mentioned.

Weak Pointer Recognition

An example of the analysis system of the invention analyzes whether a pointer can be highjacked to allow writing arbitrary data to an arbitrary target. Separately, common features or modes of vulnerabilities are recognized once they can be fed or demonstrated to the present invention. Recognizing the weak pointer feature is twofold: from the set of all pointers, the case in which a pointer is sound when evident from the program can sometimes be seen, the known weak pointers and the unidentified can be distinguished into subsets using analyses. The rules for the weak pointer recognition are exactly two: a read with a corrupted pointer and write of corrupted data. There are many pointers, and any pair can match. Because these pairs are not immediately visible, they must be continuously updated during evaluation for a match.

Human Comprehension of Vulnerability

An example of the analysis system includes a translation mechanism for detection of weaknesses and vulnerabilities, and their associated paths, for the classification and grouping to standards including the Common Weakness Enumeration (CWE) standard, NIST/MITRE, ISA, and others. Another example of the analysis system, extends the explanation of a vulnerability, such as how to verify it with a generated program to automate exploitation and manual verification and/or analysis measures. Yet another example of the analysis system, describes the weakness and/or vulnerability with a mitigation strategy or suggestion.

Path Factoring

An example of the analysis system includes path factoring (e.g., implementing a path factoring plugin), which is basically a way to trade memory in exchange for reductions in execution time. Path factoring associates groups of values with corresponding paths and properties, representing what property is required for what path. It also maintains a property representation of the data as calculated by the program so far. It strives to group values with like properties according to memory efficient characterization techniques.

By keeping these values in memory, the set of shared sub-computations are retained across runs so that permutations of the input and analysis of the code are recomputed using saved memory, restarting from work that was already done. As memory is re-used, the evaluation of functions can explore sub-computations of a function that do not have to restart at the beginning.

Binary Rewriting

In an example of the analysis system, the mitigation efforts of the enhanced explanation of weaknesses and/or vulnerabilities are combined with binary rewriting features such as control flow integrity to automate the hardening and security of a binary file. The result of this feature of this example of the analysis system is a replacement binary file that is eligible to replace the original binary file with the extended security and hardening features.

The invention is designed to leverage a wide array of analytical techniques to enhance computational efficiency and data processing capabilities. While it includes examples such as Weak Pointers, Path Condition Computation, Pre-computation with Indexing, Program Anthologies, Smart Value Generation, Symbolic Analysis Improvements, and Fourier Transform Analysis, these are presented as illustrative instances. The core value of the invention lies in its adaptable framework, which is capable of incorporating various forms of analyses, demonstrating its versatility in addressing complex computational challenges. The mentioned analyses exemplify the types of strategies that can be effectively utilized, highlighting the invention's capacity to adapt to a diverse range of analytical needs rather than mandating the use of specific assessments.

The inventive framework is architected to accommodate a multifaceted approach towards binary analysis and to ensure inclusivity in accessibility, catering to a diverse use cases, scenarios, and deployment environments. The invention incorporates an expansive range of interface modalities without limitation, including but not limited to, DSL, NLC, command-line interfaces (CLI), application programming interfaces (APIs), OpenAPI specifications for complex systems integration, and graphical user interfaces (GUIs). The architecture of the invention facilitates an expansive range of deployment capabilities without limitation, including but not limited to, cloud-native computing environments, containerized virtual environments, bare-metal operations, as well as on-premises infrastructure.

The below disclosure demonstrates the invention's flexibility in applying a broad spectrum of analytical techniques within its framework. This flexibility underscores the invention's capability to not only incorporate the specified analyses but also adapt to a wide array of additional analytical strategies, showcasing its versatility in addressing diverse computational challenges.

The invention's design leverages various analytical techniques, with the examples provided serving as select examples of the analysis system into the potential applications within its framework. Although the individual aforementioned analyses can illustrate the types of computational strategies the invention can employ, the invention itself is not limited to any type of analysis, and rather encompasses a broader range of analyses beyond those explicitly listed. This design philosophy ensures that the invention remains adaptable and forward-looking, poised to accommodate emerging computational challenges and methodologies.

FIG. 1 exemplifies a block diagram representation of analyzing a Program's (110) recursive semantics through graph form, serving as an illustrative instance of the broader concepts embodied in the invention. This diagram provides an example of how recursion in programming can be visualized and/or analyzed in a two-dimensional coordinate system, representing an instance of the methodological approach of the invention.

For example, a Program (110) may be an input that may contain a while loop with multiple statements (statement_1, statement_2, ... statement_n). This example aligns with the process of analyzing a Program's (110) recursive behavior, illustrating how each iteration and statement within the loop contributes to the overall recursive process in an exemplary manner.

In this example, the X-axis X: Iteration (120) and Y-axis Y: Property Symmetry (130) of the diagram are utilized to plot the recursion. X: Iteration (120), representing iteration from positive (+Reals (121)) to negative (−Reals (123)) infinity, captures the extent of recursive iterations in an exemplary fashion. Concurrently, Y: Property Symmetry (130), representing property symmetry from positive (+Imaginary (131)) to negative (−Imaginary (133)) infinity, illustrates the depth of recursion in terms of its symmetry, providing a multi-dimensional view of the program's execution as an illustrative instance.

A Symmetrical Structure (140) in the diagram exemplifies the step of identifying symmetry functions within the recursive process. This part of the diagram plays a key role in understanding, through an example, how different iterations of recursion relate to each other and/or contribute to the overall flow and/or behavior of the program.

An exemplary plot in the quadrant's Symmetrical Structure (140), with a horizontal line that splits and/or diverges, serves as an illustrative instance of the complex analytic extension between individual recursive frames. The geometric angles at the Divergent Tails (141) provide an analytical perspective, through this example, on the branching paths of recursion, illustrating the complexity and/or variability in the program's execution in an exemplary manner.

FIG. 2 serves as an example block diagram illustration, capturing the transition from detailed graph models of algorithms—characterized by their unique symmetry structures and/or self-similarities—to a consolidated and/or efficient index. FIG. 2 exemplifies the process of indexing algorithms based on their structural and/or functional characteristics. The employment of various plots and/or the inclusion of an index symmetry table in this example provide insight into how algorithms are processed, categorized, and/or made retrievable in this indexing system.

The diagram features two Symmetrical Structures (240/241), each situated in distinct quadrants of the 2D plot, exemplifying the diversity of algorithm structures being modeled. This corresponds to the initial step of transforming each program into its respective graph model, showcasing the uniqueness in their symmetry functions. The portrayal of these structures, particularly with divergence and/or angle notations, serves as an illustration of the complexity and/or multifaceted nature of algorithm behaviors.

Further exemplified in the diagram are two circular, cloud-like structures in the second 2D plot, with one being larger than the other, representing the concept of Self-similar Structures (210). Their undulating, non-linear form symbolizes the non-obvious nature of self-similarities within algorithms. Positioned centrally at (0,0) and varying in size, the example diagram illustrates the scale invariance property of these structures, highlighting the fundamental similarities between different algorithms despite their superficial differences.

An indexing process of these graph models is embodied in the symmetry values of the 2D plots. Index Table Entries (220) correspond to a symmetry function from Symmetrical Structures (140) or self-similar structure from Self-similar Structures (210), denoting the origin of the index from a symmetry function or self-similar structure. This mapping process is depicted as a function of organizing units derived from analysis. The values are cataloged in a table, facilitating reverse mapping back to their respective Original Programs (230), showcased as an index effectively represented in disk or memory storage.

FIG. 3 exemplifies a block diagram visualization of the lookup process within the invention, illustrating how indexed algorithms, categorized based on their symmetry functions and/or structures, are retrieved from the index. This diagram serves as an example to underscore the efficiency of the retrieval process and demonstrates how bifurcation structures facilitate quick and/or accurate lookups from the index.

The diagram delineates the procedural steps exemplarily, from fitness classification and/or group assignment, leading to the actual lookup of algorithms. This showcases the system's efficiency and accuracy. Beginning with a Fitness Classification Step (310), where various algorithm structures, such as but not limited to bifurcation structures, are evaluated. This stage is instrumental for assessing the characteristics of each structure, determining their suitability for indexing. Bifurcation structures, chosen for their efficacy in encapsulating complex program characteristics, are visually depicted in the example diagram, displaying their interconnections and/or the encompassed symmetry functions.

Following classification, the diagram exemplifies the transition to a Group Assignment (320), where these structures are assigned to specific groups based on their cohesive fit. This process is integral in organizing and/or categorizing algorithms within the index for efficient retrieval. An Original Program (230) is depicted as being loaded from disk, bringing into play Index Table Entries (330). These entries provide examples of a Symmetry Functions Group (333) and Self-Similar Structures Group (335), allowing for a Direct Correlation (340) between the program's characteristics and its classified group. This illustration serves as an exemplary representation of the process, emphasizing the methodical and organized approach of the invention in algorithm categorization and/or retrieval.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for analyzing binary computing system program data for recursive semantics, the recursive semantics being computational constructs and mechanisms that facilitate self-reference or repetition within binary program inputs and that enable repeated execution of a block of code through direct self-reference, the method comprising:

receiving, via a processor, from a data storage, a memory, or via a communication, or via a user entry through a user interface, at least one binary program input;

analyzing, via the processor, the at least one binary program input using at least one analysis, the at least one analysis configured to extract aspects of structural and functional characteristics of the at least one binary program input;

creating, via the processor, at least one graphical representation or vector of the recursive semantics of the at least one binary program input, wherein said at least one graphical representation or vector captures the structural and functional characteristics of the at least one binary program input corresponding to the recursion and iteration processes within algorithms of the at least one binary program input;

initializing, if not previously established, at least one program anthology by processing a plurality of known binary programs with identified recursive semantics through the steps of receiving, creating, and analyzing, to accumulate a foundational dataset of algorithms characterized by their structural and functional attributes relevant to the recursive semantics;

indexing, subsequent to analysis and initialization, the algorithms of the at least one binary program input within the at least one program anthology, based on their identified structural and functional characteristics, wherein the indexing involves categorizing the identified structural and functional characteristics in relation to symmetry functions and structures indicated in the created at least one graphical representation or vector, thereby enabling gradual enrichment of the at least one program anthology with new algorithmic patterns and recursive semantics insights;

storing, the indexed at least one program anthology on data storage, memory, or transmitting the indexed at least one program anthology via communication channels for future reference and retrieval;

retrieving, via a processor, from the data storage, the memory, or via the communication one or more previously categorized second algorithms, the at least one program anthology; and determining, via the processor, from the at least one retrieved previously categorized second algorithms, an output indicating the recursive semantics being present in the at least one binary program input that enable the identification of potential security vulnerabilities.

2. The method of claim 1, wherein the at least one binary program input includes a pre-compiled, pre-linked program that is ready to run under an operating system.

3. The method of claim 1, wherein the at least one graphical representation includes plotting recursion in the at least one binary program input on a two-dimensional coordinate system using an X-axis for iterations and a Y-axis for property symmetry, recursion using iteration from positive to negative infinity on the X-axis and property symmetry from positive to negative infinity on the Y-axis, visual graphical representation, or non-visual graphical representation.

4. The method of claim 1, wherein the recursive semantics include one or more recursive patterns that indicate the potential security vulnerabilities, a recursion in which a function calls itself with modified parameters, iterative processes including for-loops and/or while-loops, and callback functions that perform deferred operations that invoke recursive behavior or iterative execution patterns.

5. The method of claim 1, wherein analyzing the at least one analysis includes utilization of a symmetrical structure plot within a two-dimensional coordinate system to demonstrate a complex analytic extension between individual recursive frames of the at least one binary program input.

6. The method of claim 1, wherein the at least one analysis includes a weak pointers analysis, a path condition computation analysis, precomputation with an indexing analysis, a program anthologies analysis, a smart value generation analysis, symbolic analysis improvements, a Fourier transform analysis, or transforming the at least one binary program input into graph models that represent the recursive semantics and algorithmic structures.

7. The method of claim 1, further comprising identifying symmetrical structures within the recursive semantics to understand how different iterations of recursion relate to each other and contribute to the overall program behavior, computational efficiency, or data processing capabilities, whereby the symmetrical structures comprises a graphical analysis, a visual analysis, a numerical analysis, a machine learning based analysis, an artificial intelligence based analysis, an algorithmic analysis, or divergent tails within the graphical representation to provide an analytical perspective on branching paths of recursion.

8. The method of claim 1, further comprising performing a lookup process for retrieving the at least one previously categorized second algorithms from the indexed algorithms based on direct correlation between the characteristics of the algorithms and their classified groups, thereby enhancing the efficiency of algorithm retrieval.

9. The method of claim 1, wherein indexing the algorithms involves mapping symmetry values and self-similar structures derived from the graphical representation to index table entries to facilitate reverse mapping back to their respective original programs, or evaluating algorithm structures for suitability of the algorithm structures for indexing the algorithm by evaluating the efficacy of bifurcation structures in encapsulating complex program characteristics.

10. The method of claim 1, wherein the output includes indicated potential security weaknesses in the at least one binary program input with at least one symmetrical structure and the at least one analysis with a corresponding quantitative or qualitative result on branching paths of recursion.

11. A computer-implemented system for analyzing binary computing system program data for recursive semantics, the recursive semantics being computational constructs and mechanisms that facilitate self-reference or repetition within binary program inputs and that enable repeated execution of a block of code through direct self-reference, the system comprising:
a processor; and
a memory storing a computer-executable program, wherein when the computer-executable program is executed by the processor, the computer-executable program configures the processor to:
receive, from a data storage, a memory, or via a communication, or via a user entry through a user interface, at least one binary program input;
analyze the at least one binary program input using at least one analysis, the at least one analysis configured to extract aspects of structural and functional characteristics of the at least one binary program input;
create at least one graphical representation or vector of the recursive semantics of the at least one binary program input, wherein said at least one graphical representation or vector captures the structural and functional characteristics of the at least one binary program input corresponding to the recursion and iteration processes within algorithms of the at least one binary program input;
initialize, if not previously established, at least one program anthology by processing a plurality of known binary programs with identified recursive semantics through the steps of receiving, creating, and analyzing, to accumulate a foundational dataset of algorithms characterized by their structural and functional attributes relevant to the recursive semantics;
index, subsequent to analysis and initialization, the algorithms of the at least one binary program input within the at least one program anthology, based on their identified structural and functional characteristics, wherein the indexing involves categorizing the identified structural and functional characteristics in relation to symmetry functions and structures indicated in the created at least one graphical representation or vector, thereby enabling gradual enrichment of the at least one program anthology with new algorithmic patterns and recursive semantics insights;
store the indexed at least one program anthology on data storage, memory, or transmitting the indexed at least one program anthology via communication channels for future reference and retrieval;
retrieve from the data storage, the memory, or via the communication one or more previously categorized second algorithms, the at least one program anthology; and
determine from the at least one retrieved previously categorized second algorithms, an output indicating the recursive semantics being present in the at least one binary program input that enable the identification of potential security vulnerabilities.

12. The system of claim 11, wherein the at least one binary program input includes a pre-compiled, pre-linked program that is ready to run under an operating system.

13. The system of claim 11, wherein the at least one graphical representation includes plotting recursion in the at least one binary program input on a two-dimensional coordinate system using an X-axis for iterations and a Y-axis for property symmetry, recursion using iteration from positive to negative infinity on the X-axis and property symmetry from positive to negative infinity on the Y-axis, visual graphical representation, or non-visual graphical representation.

14. The system of claim 11, wherein the recursive semantics include one or more recursive patterns that indicate the potential security vulnerabilities, a recursion in which a function calls itself with modified parameters, iterative processes including for-loops and/or while-loops, and callback functions that perform deferred operations that invoke recursive behavior or iterative execution patterns.

15. The system of claim 11, wherein the at least one analysis is analyzed by utilization of a symmetrical structure plot within a two-dimensional coordinate system to demonstrate a complex analytic extension between individual recursive frames of the at least one binary program input.

16. The system of claim 11, wherein the at least one analysis includes a weak pointers analysis, a path condition computation analysis, precomputation with an indexing analysis, a program anthologies analysis, a smart value generation analysis, symbolic analysis improvements, a Fourier transform analysis, or transforming the at least one binary program input into graph models that represent the recursive semantics and algorithmic structures.

17. The system of claim 11, wherein the computer-executable program further configures the processor to identify symmetrical structures within the recursive semantics to understand how different iterations of recursion relate to each other and contribute to the overall program behavior, computational efficiency, or data processing capabilities, whereby the symmetrical structures comprises a graphical analysis, a visual analysis, a numerical analysis, a machine learning based analysis, an artificial intelligence based analysis, an algorithmic analysis, or divergent tails within the graphical representation to provide an analytical perspective on branching paths of recursion.

18. The system of claim 11, wherein the computer-executable program further configures the processor to perform a lookup process for retrieving categorized second algorithms from the indexed algorithms based on direct correlation between the characteristics of the algorithms and their classified groups, thereby enhancing the efficiency of algorithm retrieval.

19. The system of claim 11, wherein the algorithms are indexed based on mapping symmetry values and self-similar structures derived from the graphical representation to index table entries to facilitate reverse mapping back to their respective original programs, or evaluating algorithm structures for suitability of the algorithm structures for indexing the algorithm by evaluating the efficacy of bifurcation structures in encapsulating complex program characteristics.

20. The system of claim 11, wherein the output includes indicated potential security weaknesses in the at least one binary program input with at least one symmetrical structure and the at least one analysis with a corresponding quantitative or qualitative result on branching paths of recursion.

\* \* \* \* \*